US007576936B2

(12) United States Patent
Oshimi et al.

(10) Patent No.: US 7,576,936 B2
(45) Date of Patent: Aug. 18, 2009

(54) METHOD OF STARTING THE MAGNETIC DISK DEVICE USING FLUID DYNAMIC BEARING SPINDLE MOTOR

(75) Inventors: Iwao Oshimi, Kanagawa (JP); Gaku Ikedo, Kanagawa (JP); Nobuhisa Koide, Kanagawa (JP); Jiro Abe, Kanagawa (JP)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 0 days.

(21) Appl. No.: 11/899,767

(22) Filed: Sep. 7, 2007

(65) Prior Publication Data

US 2008/0062555 A1 Mar. 13, 2008

(30) Foreign Application Priority Data

Sep. 7, 2006 (JP) ............................. 2006-243201

(51) Int. Cl.
*G11B 15/46* (2006.01)
*G11B 15/18* (2006.01)

(52) U.S. Cl. ...................................... 360/73.03; 360/69
(58) Field of Classification Search ........................ None
See application file for complete search history.

(56) References Cited

U.S. PATENT DOCUMENTS

| 6,400,522 B1* | 6/2002 | Milligan ........................ 360/69 |
| 6,633,450 B1* | 10/2003 | Kaneko ..................... 360/73.03 |
| 6,735,035 B1* | 5/2004 | Smith et al. .................... 360/69 |
| 7,203,021 B1* | 4/2007 | Ryan et al. ...................... 360/75 |
| 7,362,532 B2* | 4/2008 | Iwama .......................... 360/69 |
| 2001/0000982 A1* | 5/2001 | Yamashita et al. ........ 360/73.03 |
| 2003/0103289 A1* | 6/2003 | Sakamoto ..................... 360/70 |
| 2006/0092550 A1 | 5/2006 | Ishii et al. |

FOREIGN PATENT DOCUMENTS

| JP | 2000-224891 | 8/2000 |
| JP | 2006-134377 | 5/2006 |

* cited by examiner

*Primary Examiner*—Andrew L Sniezek
(74) *Attorney, Agent, or Firm*—Townsend and Townsend and Crew LLP; Darren Gold

(57) ABSTRACT

Embodiments of the present invention provide a magnetic disk device including a spindle motor using a fluid dynamic bearing, which can send back READY within a period requested by a host system at the time of starting a magnetic disk device under low temperature and low supply voltage conditions without a particular heating approach. According to one embodiment, the magnetic disk device sets a waiting time in a period from when a spindle motor reaches a rated speed until when an HSA is loaded to a magnetic disk at the time of starting under low temperature and low supply voltage conditions within such a range that the timeout of the host does not occur, and the spindle motor itself is heated by rotation of the spindle motor in the waiting time to lower viscosity of the lubrication fluid to ensure sufficient voltage margin for an SPM driver.

16 Claims, 8 Drawing Sheets

METHOD OF STARTING THE MAGNETIC DISK DEVICE USING FLUID DYNAMIC BEARING SPINDLE MOTOR

CROSS-REFERENCE TO RELATED APPLICATION

The instant nonprovisional patent application claims priority to Japanese Patent Application No. 2006-243201 filed Sep. 7, 2006 and which is incorporated by reference in its entirety herein for all purposes.

BACKGROUND OF THE INVENTION

A fluid dynamic bearing device has been used for a cylinder bearing of video tape recorder etc. because the device has a feature that non-repeatable runout (NRRO) is small as compared with a ball bearing, and the device is suitable for high-speed rotation. On the other hand, in the magnetic disk device, a rotational accuracy of a conventional spindle motor using a ball bearing is insufficient in accordance with recent increase in magnetic recording density, and the spindle motor has been shifted to a spindle motor using a fluid dynamic bearing. Further, the fluid dynamic bearing has a feature that an operation sound is quiet under operating because there is no solid contact portion unlike a ball bearing.

Recently, the magnetic disk device has been widely used also in the field of a domestic electric product such as being built in a DVD recorder. In the field of a domestic electric product, there is a need to reduce an operation sound especially during operations of the product, and the use of the magnetic disk device equipped with a spindle motor that uses a fluid dynamic bearing has rapidly expanded. Further, the use of the magnetic disk device with a fluid dynamic bearing spindle motor as an external memory of a computer in a notebook or desktop type personal computer or an RAID device has expanded for similar reasons.

In general, the dynamic pressure fluid dynamic bearing device is composed of a stationary member and a rotational member. The stationary member includes a thrust fluid dynamic bearing and a radial fluid dynamic bearing, and a lubrication fluid is maintained between the rotational member and the stationary member. When the spindle motor is rotated, a lubrication fluid moves through a U-shaped, V-shaped, or herringbone groove formed in a thrust fluid dynamic bearing, a radial fluid dynamic bearing, etc., and a dynamic pressure is generated by the pumping action. As a result, the rotational member is raised from the stationary member and is kept in noncontact with the stationary member.

A friction resistance during rotation of the fluid dynamic bearing spindle motor is chiefly generated by viscosity of the lubrication fluid. In general, the temperature dependence of the viscosity of the lubrication fluid is high. In particular, a necessary start torque increases because the viscosity rises remarkably at the low temperature, and a voltage margin equivalent to that at the normal temperature might not be secured in the spindle motor driving system. Therefore, it takes much time to reach the rated rpm or the rated rpm is not reached, or a rotational failure occurs in some cases.

Moreover, the spindle motor is started in the magnetic disk unit that adopts the load/unload mechanism with a head stack assembly (HSA) being retracted. Afterwards, when the spindle motor reaches the rated rpm, the HSA is loaded onto a rotating disk. In this case, the drag torque is generated along with the loading of the HSA, which applies a further load onto the spindle motor.

To that end, a method of lowering the viscosity of a lubrication fluid is necessary to decrease the load upon starting the spindle motor at the low temperature, and the following measures have been taken as the conventional technique.

Japanese Patent Publication No. 2000-224891 ("Patent Document 1") discloses a technique of supplying an overcurrent to a coil of a spindle motor to heat the spindle motor and reduce the viscosity of a lubrication fluid for the purpose of suppressing increase in rotational load under low-temperature operation environments.

Japanese Patent Publication No. 2006-134377 ("Patent Document 2") discloses that a current is supplied to preheat a magnetic transducer before a spindle motor reaches a rated speed to ensure write characteristics under lower temperature of the magnetic transducer, and describes a sequence of loading an HSA after the elapse of a predetermined period to preheat the magnetic transducer after the rated speed is reached.

In recent years, there are more and more cases of installing a magnetic disk device with a spindle motor in notebook or desktop type personal computer. In addition, there are more and more opportunities that the device is used in the form of composing RAID as an external memory of a large computer system. Thus, the magnetic disk device is requested to operate in various use environments, and in particular, a demand to expand an operating temperature range has been increasing. Concretely, the operating temperature range of 5° C. to 55° C. is expanded to the operating temperature range from 0° C. to 60° C.

On the other hand, there is a tolerance also in a power supply voltage supplied to the magnetic disk device. In general, variations of a reference supply voltage of ±10% to ±5% are allowed and defined as specifications.

When the operating temperature is changed from 5° C. to 0° C., the viscosity of a lubrication fluid rises remarkably because a temperature dependence of the viscosity of the lubrication fluid of the fluid dynamic bearing spindle motor is high. In particular, if the magnetic disk device starts after being left in the atmosphere of 0° C. for long time under power-off, a problem that the voltage margin of the spindle motor driving system will be lost, and a rated speed cannot be reached, for instance, when a supply voltage is −10% (10.8 V to 12V) because the rotation load increases by the rise of the viscosity of the lubrication fluid.

Moreover, in the magnetic disk device that adopts the mechanism that load/unloads the magnetic head on the disk, the spindle motor is started with the HAS having a magnetic transducer unloaded and a rated speed is reached, and then a head slider is loaded on the rotating magnetic disk. Then the head slider is loaded, the drag torque is generated because a part of an arm of a carriage that constitutes the HSA that holds the head slider opposes the rotating magnetic disk surface, and the rotation load of spindle motor further increases. Therefore, if the spindle motor driving system cannot deal with an increase of the load upon loading the HSA, the spindle motor cannot maintain the rated speed. That is, the voltage margin will be lost in the unloaded state, and a rotation failure might occur even at the rated speed in the loaded state. The magnetic disk device can enter a usable state (READY) only after the spindle motor reaches the rated speed with the head slider loaded. It is not possible to respond to a host system connected to the magnetic disk device unless the device is READY.

On the other hand, in a host system such as a personal computer using the magnetic disk device as a data storage, a period from power-on of the host system until when the magnetic disk device becomes READY is previously determined. If READY cannot be sent back within the period preset by the host system because it takes much time for the spindle motor to reach a rated speed in the magnetic disk device, a timeout error occurs. Thus, the period from power-ON to READY is defined as specifications in the magnetic disk device.

Patent Document 1 above discloses that the spindle motor is heated to supply an overcurrent to a coil for reducing a viscosity of a lubrication fluid. However, under such conditions that the voltage margin is lost, the overcurrent hardly flows. Further, there is no description about increase in load to the spindle motor upon loading.

Patent Document 2 above describes that the HSA is loaded after a predetermined period from when the spindle motor reaches the rated speed, but a period necessary for heating a magnetic transducer is as short as several hundreds of mm, so an effect of heating the lubrication fluid of the spindle motor cannot be expected.

BRIEF SUMMARY OF THE INVENTION

Embodiments of the present invention is provide a magnetic disk device including a spindle motor using a fluid dynamic bearing, which can send back READY within a period requested by a host system at the time of starting a magnetic disk device under low temperature and low supply voltage conditions without particular heating means. According to the embodiment shown in FIG. 4, the magnetic disk device sets a waiting time in a period from when a spindle motor reaches a rated speed until when an HSA 50 is loaded to a magnetic disk 11 at the time of starting under low temperature and low supply voltage conditions within such a range that the timeout of the host 150 does not occur, and the spindle motor itself is heated by rotation of the spindle motor 30 in the waiting time to lower viscosity of the lubrication fluid to ensure sufficient voltage margin for an SPM driver 111.

DETAILED DESCRIPTION OF THE INVENTION

Figure 1:
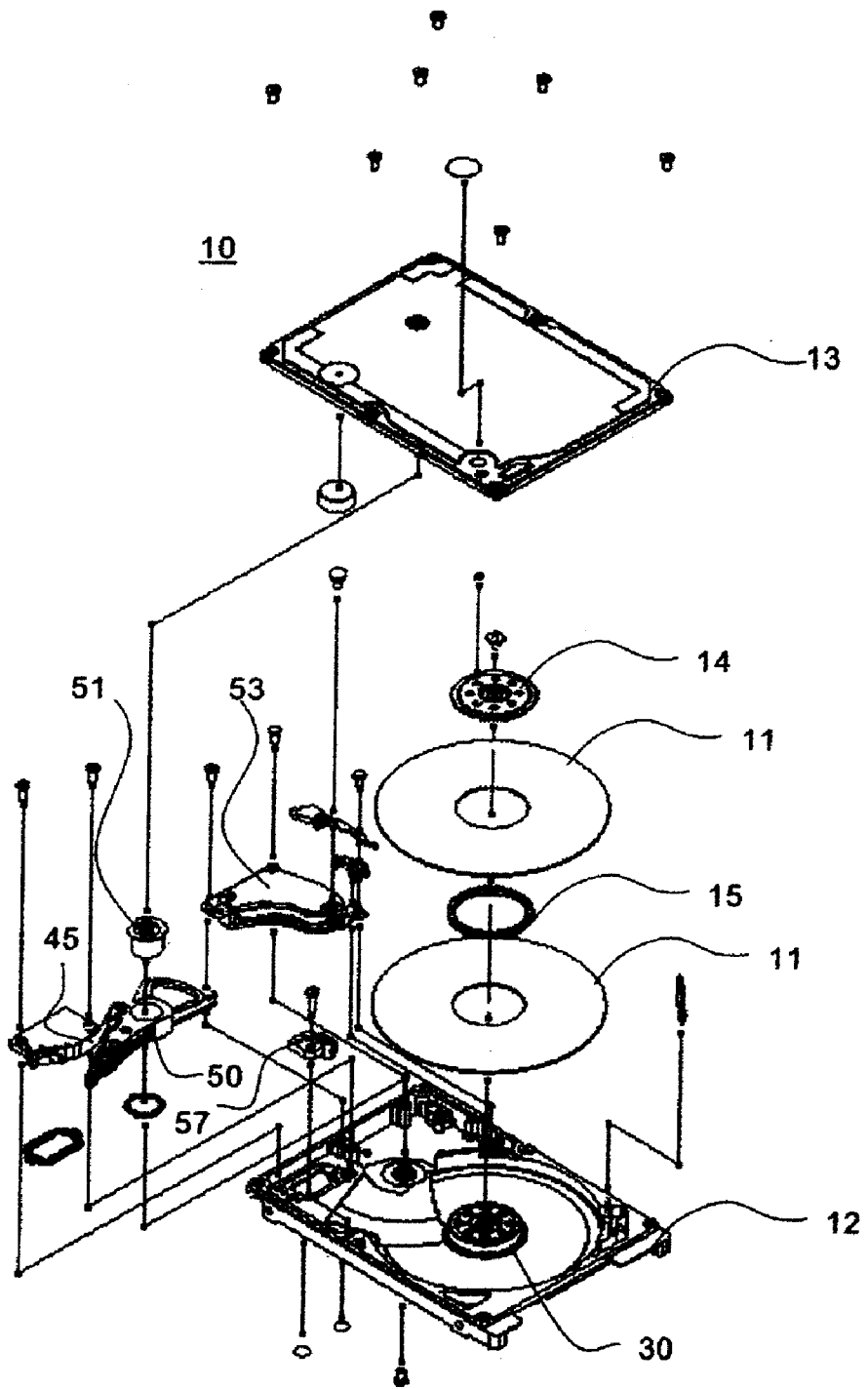
FIG. 1 is an exploded perspective view of a magnetic disk device according to an embodiment of the present invention.

Embodiments of the present invention relate to a magnetic disk device using a fluid dynamic bearing spindle motor, and more specifically to a method of starting a magnetic disk device.

Embodiments of the present invention have been accomplished in view of the above problems, and an object in accordance with embodiments of the invention is to provide a magnetic disk device capable of sending back READY within a period requested by a host system without using particular heating means upon starting the magnetic disk device under low-temperature and low supply voltage conditions.

To solve the above problems, a magnetic disk device according to embodiments of the present invention sets a waiting time within a range that a time-out of a host does not occur, before loading a magnetic head to a disk at the time of starting the device, and a spindle motor itself is heated by the spindle motor rotating in the waiting time to lower the viscosity of the lubrication fluid to ensure a sufficient voltage margin.

An ambient temperature around the magnetic disk device can be grasped with a temperature sensor built in the magnetic disk device itself. It is determined whether or not to set a waiting time and a length of the waiting time can be adjusted by the ambient temperature.

Further, the magnetic disk device can grasp a voltage supplied from the host. Under low supply voltage conditions as well as under low-temperature conditions, it is difficult to ensure a voltage margin of the spindle motor driving system, so it is possible to determine whether or not to set a waiting time and adjust a length of the waiting time based on a combination between the ambient temperature and the supply voltage.

Further, if it is difficult to ensure a voltage margin of the spindle motor driving system under low supply voltage conditions as well as under low-temperature conditions, a gradient of an rpm increase curve of the spindle motor relative to the elapsed time from startup is gentle. Thus, it is possible to determine whether or not to set a waiting time and adjust a length of the waiting time in accordance with the rpm increase curve of the spindle motor (rmp increase) in place of a combination between the ambient temperature and the supply voltage.

Incidentally, in general, the magnetic disk device reads a reserved area (area having system information written thereto) upon startup, but under low supply voltage conditions as well as under low-temperature conditions, it takes much time to stabilize the rpm of the spindle motor in some cases. By relaxing the spindle motor rotation accuracy upon reading the reserved area only within a predetermined period from startup of the spindle motor, data written to the reserved area can be read out even in such a state that the speed does not fall within a specified range of the rated rpm necessary for reading/writing user data, and READY can be sent back.

According to embodiments of the present invention, it is possible to provide a magnetic disk device where the spindle motor can start, keep a rated speed, and become READY within a preset period, without equipped with a particular spindle motor heating mechanism or spindle motor driving system also under low-temperature conditions or low supply voltage conditions of a magnetic disk device using a fluid dynamic bearing spindle motor.

Hereinafter, embodiments of the present invention will be described. The following description aims at illustrating the embodiments of the present invention, and the present invention is not limited to the following embodiments. For clear explanation, the following description and drawings are omitted and simplified as appropriate. Those skilled in the art would readily understand that components of the following embodiments are changed, added, and exchanged within the scope of the present invention. Incidentally, the same components are denoted by identical reference numerals throughout the drawings, and repetitive description is omitted here for ease of explanation if needed.

To facilitate understanding of features of these embodiments, the overall configuration of a magnetic disk device is first described.

Figure 2:
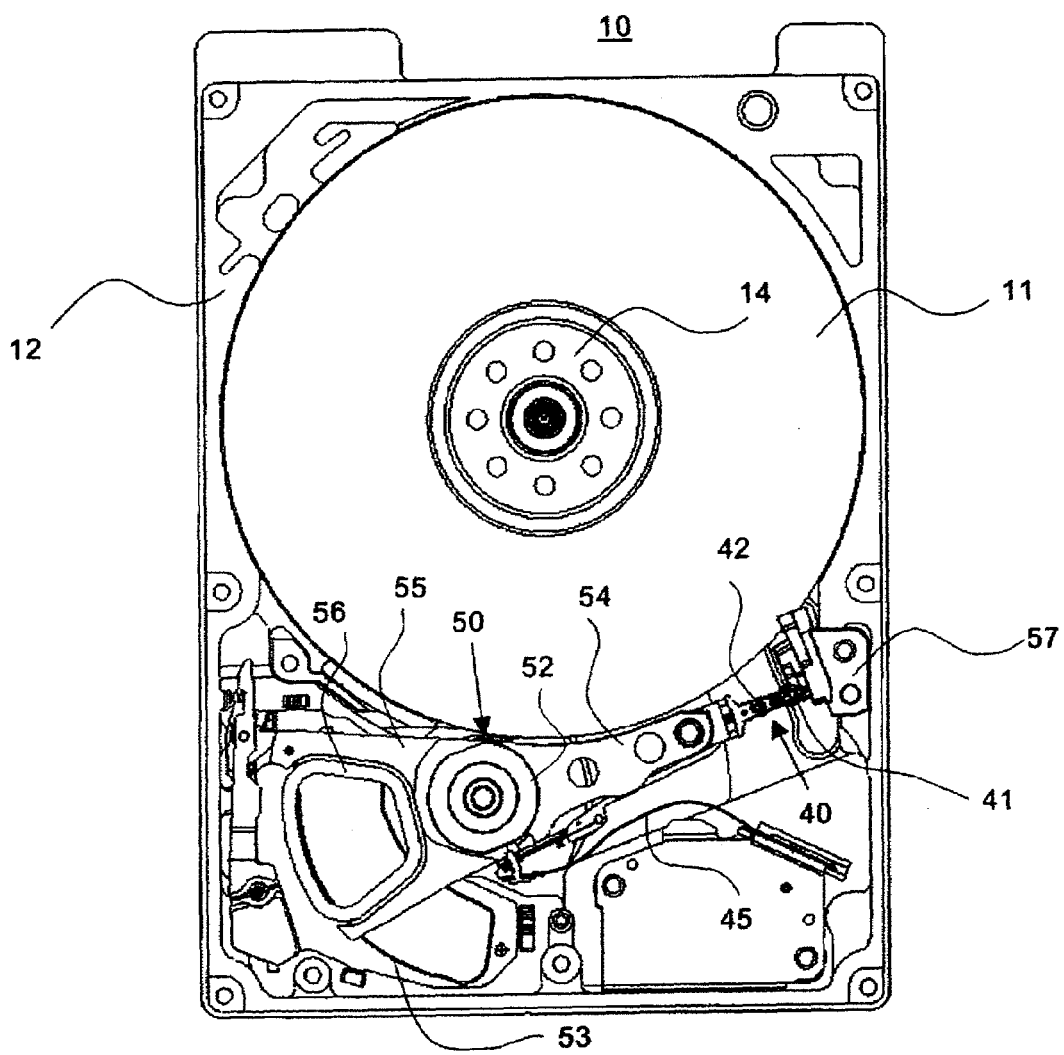
FIG. 2 is a plan view of the magnetic disk device according to an embodiment of the present invention.

FIG. 1 is an exploded perspective view of a magnetic disk device 10 according to one embodiment. A magnetic disk 11 is a medium for storing data and is nonvolatile recording disk having a magnetic layer which is magnetized to record data. A base 12 is fixed to a cover 13 covering an upper opening of the base 12 through a gasket (not shown). Thus, a disk enclosure 20 (FIG. 4) is configured, which can accommodate components of the magnetic disk device 10. Reference numeral 30 denotes a spindle motor integrated as a part of the base 12. The magnetic disk 11 is fixed to the spindle motor 30 by a clamp 14 with the intervention of a spacer 15. The magnetic disk 11 is rotated at a predetermined angular speed (speed) by the spindle motor 30. If the magnetic disk device 10 is not operating, the magnetic disk 11 is at rest. Reference numeral 50 denotes a head stack assembly (HSA) for holding and moving ahead gimbal assembly (HGA) 40 (FIG. 2). The HSA 50 is slidably held to a pivot assembly 51 having the rotation shaft composed of a bearing. Reference numeral 53 denotes a voice coil motor (VCM). Reference numeral 57 denotes a ramp for retracting a head slider 41 (FIG. 2) from the surface of the magnetic disk 11 when the magnetic disk 11 stops rotating.

FIG. 2 is a plan view of the uncovered magnetic disk device, and shows the magnetic disk device 10 when the HSA 50 is at rest (HSA 50 is unloaded). To facilitate understanding of the structure of the HSA 50, such a state that an upper yoke of the VCM 53 is removed is illustrated.

Reference numeral 40 denotes an HGA including a magnetic transducer (not shown) for writing/reading data input/output to/from the host 150 (FIG. 4) to/from the magnetic disk 11. In the magnetic transducer, a storage element for converting an electric signal into a magnetic field in accordance with recording data to the magnetic disk 11 and a reproduction element for converting the magnetic field from the magnetic disk 11 into an electric signal are integrally formed. Incidentally, the storage element and the reproduction element may be separately formed. Further, embodiments of the present invention are applicable to a magnetic disk device including at least one of the storage element and the reproduction element. The magnetic transducer is provide on the side of the head slider 41 and integrated to the head slider 41 and a suspension 42 to constitute the HGA 40.

The above electric signal is supplied through a signal transmission path formed on a flexible cable 45 attached to the HSA 50. A temperature sensor 46 (FIG. 4) is incorporated to a part of the flexible cable 45, and a temperature in the disk enclosure 20 can be measured.

The above HSA 50 includes a carriage 52 and a voice coil motor (VCM) 53 as a driving mechanism. The carriage 52 includes components coupled in the order of the HGA 40, the arm 54, and the coil support 55 from the tip end where the head slider 41 is placed. The suspension 42 supports the head slider 41 by a dimple (not shown) provide on the opposite side of the magnetic disk 11 at one point.

The coil support 55 holds a flat coil 56. The flat coil 56 is integrated to be nipped between magnets attached to the VCM 53.

At the tip end of the suspension 42, a tag (not shown) is formed, and the tag runs on the ramp 57 to separate the head slider 41 from the magnetic disk 11. The ramp 57 is attached to the bottom surface and side surface of the base 12 in contact with the outer edge of the magnetic disk 11.

The VCM 53 swings the HSA 50 about the pivot assembly 51 in accordance with a drive signal supplied from the VCM driver 112 (FIG. 4) to the flat coil 56 to move the head slider 41 onto the recording surface of the magnetic disk 11, or move the head slider 41 from the recording surface of the magnetic disk 11 to the ramp 57.

To read/write data from/to the magnetic disk 11, the HSA 50 moves the head slider 41 to above a data area on the rotating magnetic disk 11. The HSA 50 is oscillates to thereby move the head slider 41 in a radius direction of the recording surface of the magnetic disk 11. Thus, the head slider 41 can be positioned to a desired track on the magnetic disk 11. The head slider 41 planes over the magnetic disk 11 with a predetermined space kept, in such a manner that a pressure generated by the viscosity of the air between the floating plane of the head slider 41 opposite to the magnetic disk 11 and the rotating disk 11 surface is well-balanced with a pressure applied by the suspension 42 to the magnetic disk 11 direction.

When the magnetic disk 11 stops rotation, the head slider 41 stops floating and lands on the magnetic disk 11 surface. At this time, if the head slider 41 comes into contact with the magnetic disk 11, the following problem arises: the data area of the magnetic disk 11 is damaged, and the magnetic disk 11 cannot rotate due to an adsorption phenomenon between the head slider 41 surface and the magnetic disk 11 surface. Therefore, when the magnetic disk 11 stops rotating, the HSA 50 is moved and retracted from the data area of the head slider 41 to the ramp 57 (unload). That is, the HSA 50 is rotated toward the ramp 57, and the tab at the tip end of the suspension 42 is slidably moved on the surface of the ramp 57 and sits on the parking surface (stop surface) of the ramp 57 to thereby unload the head slider 41 from the magnetic disk 11. Upon loading it, the HSA 50 supported to the parking surface is left from the ramp 57 and moved to the magnetic disk 11 surface.

Here, the magnetic disk 11 is one or more disks, and may be either one-sided recording disk or two-sided recording disk. In the case of double-sided recording, as many suspensions 42 as the number of recording surfaces are prepared, each of which holds the head slider 41 for scanning each recording surface, and is fixed to the coil support 55 through the arm 54 in a position that overlaps with the position of the other suspension 42 with a predetermined interval with respect to the magnetic disk 11. Further, in the case of double-sided recording on plural magnetic disks, the plural magnetic disks are integrally held through the spacer 15 at a predetermined distance in the rotational shaft direction of the spindle motor 30 by the clamp 14. As many suspensions 42 as the number of recording surfaces are prepared, each of which holds the head slider 41 for scanning each recording surface, and is fixed in a position that overlaps with the position of the other suspension 42 with a predetermined interval. In this case, the suspension 42 and the arm 54 are integrated and laminated. Then, the laminate may be fixed to the pivot assembly 51 together with the coil support 55, or as many arms 54 as the number of head sliders may be prepared through molding, and the suspension 42 and the coil support 55 may be fixed thereto.

Figure 3A:
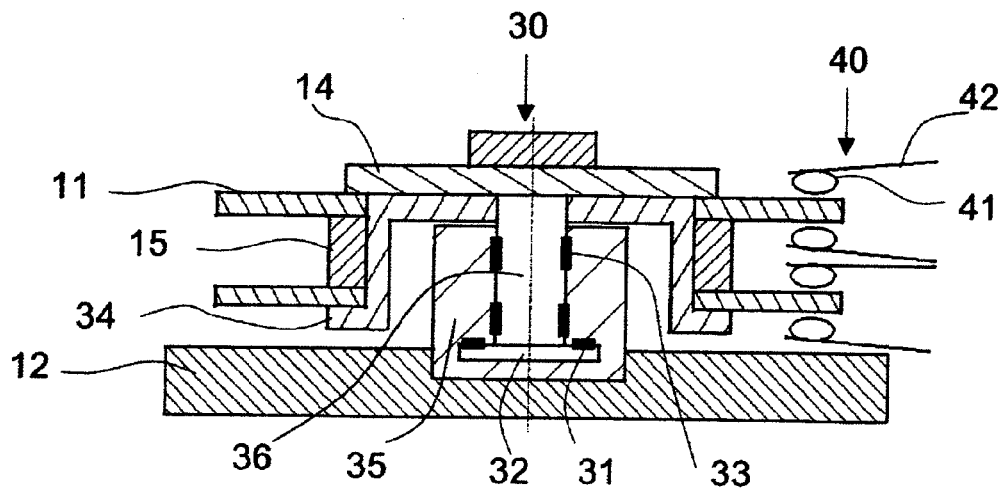
FIGS. 3(a) and 3(b) are sectional views of a spindle motor, a magnetic disk, and a magnetic head according to an embodiment of the present invention.

FIG. 3 is a sectional view of the spindle motor 30 using a fluid dynamic bearing employed in the magnetic disk device 10 of this embodiment. FIGS. 3(a) and (b) show a pivoting spindle motor. The spindle motor 30 includes a fluid dynamic bearing device. The fluid dynamic bearing device is composed of a stationary member and a rotational member, and the rotation shaft 36 as the rotational member is incorporated in a housing 35 as the stationary member. A lubrication fluid is filled in between the rotational member and the stationary member. A fluid bearing as the stationary member is provided in the housing 35, and the rotation shaft 36 as a rotational member is supported by a dynamic pressure generated by rotation of the spindle motor.

In the fluid dynamic bearing device, a thrust fluid bearing 31 and a radial fluid bearing 33 are provided. The thrust fluid bearing 31 and the radial fluid bearing 33 are composed of a groove portion and a bank portion, and the dynamic pressure is generated when the lubrication fluid flows through the formed groove in the fluid dynamic bearing device in accordance with the rotation of the shaft. In general, the fluid bearing has regularly formed groove portions and bank portions to obtain a uniform pressure distribution in a circular direction. When the spindle motor rotates, a lubrication fluid filled in the fluid dynamic bearing device flows through the groove formed in the thrust fluid bearing 31 and the radial fluid bearing 33, with the result that a dynamic pressure is generated. The rotating magnetic disk 11 is mounted on the hub 34 of the spindle motor 30, and the hub 34 is attached to the rotation shaft 36 as the rotational member and thus supported by the rigidity of the fluid dynamic bearing device.

Figure 3B:
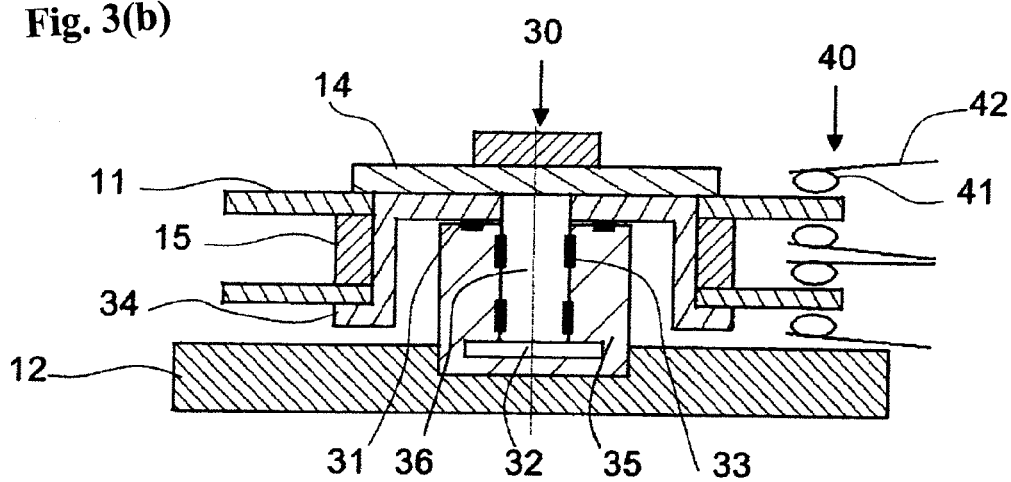

There are two forms of the thrust fluid bearing 31: as shown in FIG. 3 (a), the bearing is placed on the thrust plate 32 provided at the lower end of the rotation shaft and as shown in FIG. 3(b), the bearing is placed on the opposite side of the hub 34 of the spindle motor. Further, as described above, FIGS. 3(a) and (b) show the pivoting spindle motor, but embodiments of the present invention is also applicable to a stationary-shaft spindle motor.

Figure 4:
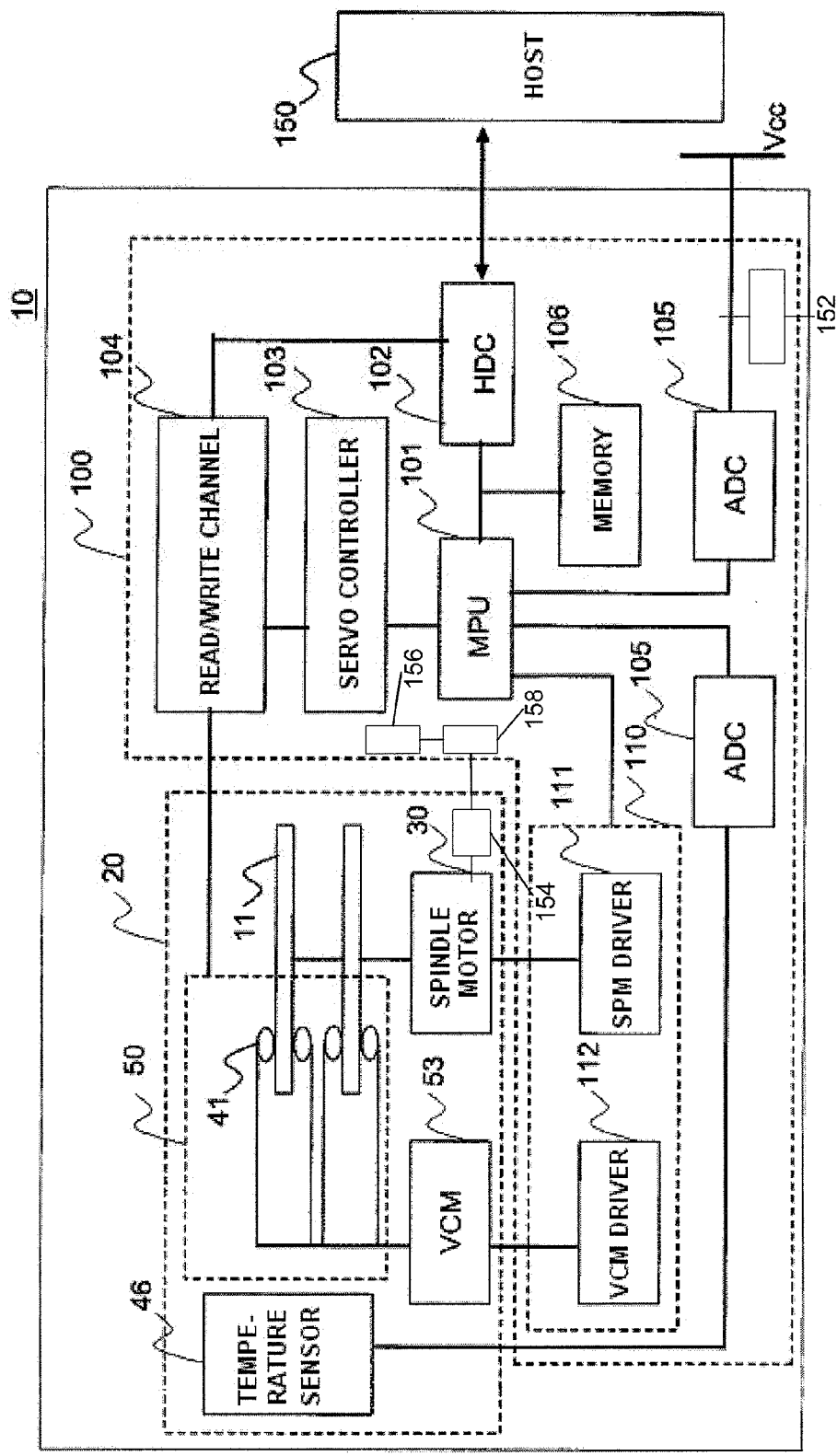
FIG. 4 is a block diagram of the magnetic disk device according to an embodiment of the present invention.

FIG. 4 is a block diagram of the magnetic disk device 10. The magnetic disk device 10 is connected with the host 150 and used as an external storage to transmit/receive data between the host 150 and the magnetic disk device 10.

User data sent from the host 150 is appropriately processed by a controller 100 and converted to a write signal and then sent to a magnetic transducer (not shown) provided in the head slider 41 mounted to the HSA 50. The magnetic transducer writes data to a recording surface of the magnetic disk 11 in accordance with the acquired write signal. On the other hand, a read signal read from the magnetic disk 11 by the magnetic transducer is converted to a digital signal by the controller 100 and subjected to necessary processing and then sent to the host 150.

The magnetic disk 11 is a nonvolatile recording medium having a magnetic layer that is magnetized to record data, and is rotated about the spindle shaft of the spindle motor 30 at a predetermined speed. Plural tracks are formed concentrically on the surface of the magnetic disk 11 as a section for storing data, and each track has plural data sectors divided in the circumferential direction.

Further, plural servo regions corresponding to a servo sampling frequency are formed on the surface of the magnetic disk 11 along the circumferential direction. Further, the data sector is formed in sync with the servo region. The servo region includes track data with track number information, sector data with sector number information, and a burst pattern.

The controller 100 includes a read/write channel 104, a hard disk controller (HDC) 102, a microprocessor unit (MPU) 101, a memory 106, an AD converter (ADC) 105, a servo controller 103, and a motor driver unit 110. The motor driver unit 110 includes a voice coil motor driver (VCM driver) 112 and a spindle motor driver (SPM driver) 111.

The read/write channel 104 executes write processing on data received from the host 150. In the write processing, the read/write channel 104 code-modulates write data supplied from the HDC 102, and converts the code-modulated write data into a write signal (current) to supply the data to the magnetic transducer. The magnetic transducer supplies a current to a head coil in accordance with the received signal to write data to the magnetic disk 11. Further, at the time of supplying data to the host 150, read processing is performed. In the read processing, the read/write channel 104 extracts data from the read signal read from the magnetic transducer and decodes the data. The decoded data is supplied to the HDC 102.

The MPU 101 operates in accordance with a microcode loaded to the memory 106, followed by necessary processing for data processing in addition to the overall control over the magnetic disk device 10 such as positional control on the head slider 41 where a magnetic transducer is formed, interface control, and defect management. Along with startup of the magnetic disk device 10, data necessary for control and data processing as well as a microcode run on the MPU 101 are loaded to the magnetic disk 11 or ROM (not shown) from the memory 106.

Digital data read by the read/write channel 104 includes user data from the host 150 and in addition, servo data. The servo controller 103 extracts servo data from the read data from the read/write channel 104. The servo data has track data, sector data, and a burst pattern. The extracted servo data is transferred from the servo controller 103 to the MPU 101. The MPU 101 uses servo data to perform positional control on head slider 41 where the magnetic transducer is formed, in accordance with the microcode. The VCM control data from the MPU 101 is set in a register of the motor driver unit 110. The VCM driver 112 supplies a drive current to the VCM 53 to rotate the HSA 50 in accordance with the set VCM control data.

The MPU 101 sets spindle motor control data in a register of the motor driver unit 110 in accordance with the microcode for controlling rotation of the spindle motor 30. The SPM driver 111 controls rotation of the spindle motor 30 in accordance with the set spindle motor control data. The SPM driver 111 supplies a drive current for rotating the spindle motor 30 to the spindle motor 30 and also detects a rotor position for the best rotational control. The rotor position detection is executed upon startup of the spindle motor 30 or rated speed.

The AD converter 105 detects a power supply voltage Vcc to convert an analog signal indicating a power supply voltage value to digital data. Digital data indicating a power supply voltage value is used for processing of the MPU 101 with a microcode. Likewise, the AD converter 105 converts an analog signal indicating an ambient temperature from the temperature sensor 46 to digital data, and the digital data indicating an ambient temperature is used for processing of the MPU 101 with a microcode.

The hard disk controller 102 has an interface function with the host 150, and receives user data and commands such as a read command or a write command sent from the host 150. The received user data is transferred to the read/write channel 104. Further, data read from the magnetic disk 11, which is obtained from the read/write channel 104, is transferred to the host 150. The hard disk controller 102 further executes code generating processing for error correction (ECC) on user data from the host 150. Further, error correction is performed on the data read from the magnetic disk 11. The magnetic disk device 10 further comprises a voltage measuring unit configured to measure a voltage applied to the magnetic disk device 10, a rpm detecting unit 154 configured to detect an rpm of the spindle motor 30, a time measuring unit 156, and a rpm increase calculating unit 158 configured to calculate an increase in rpm per unit time based on the time measured by the time measuring unit and the rpm of the spindle motor detected with the rpm detecting unit.

Figure 5:
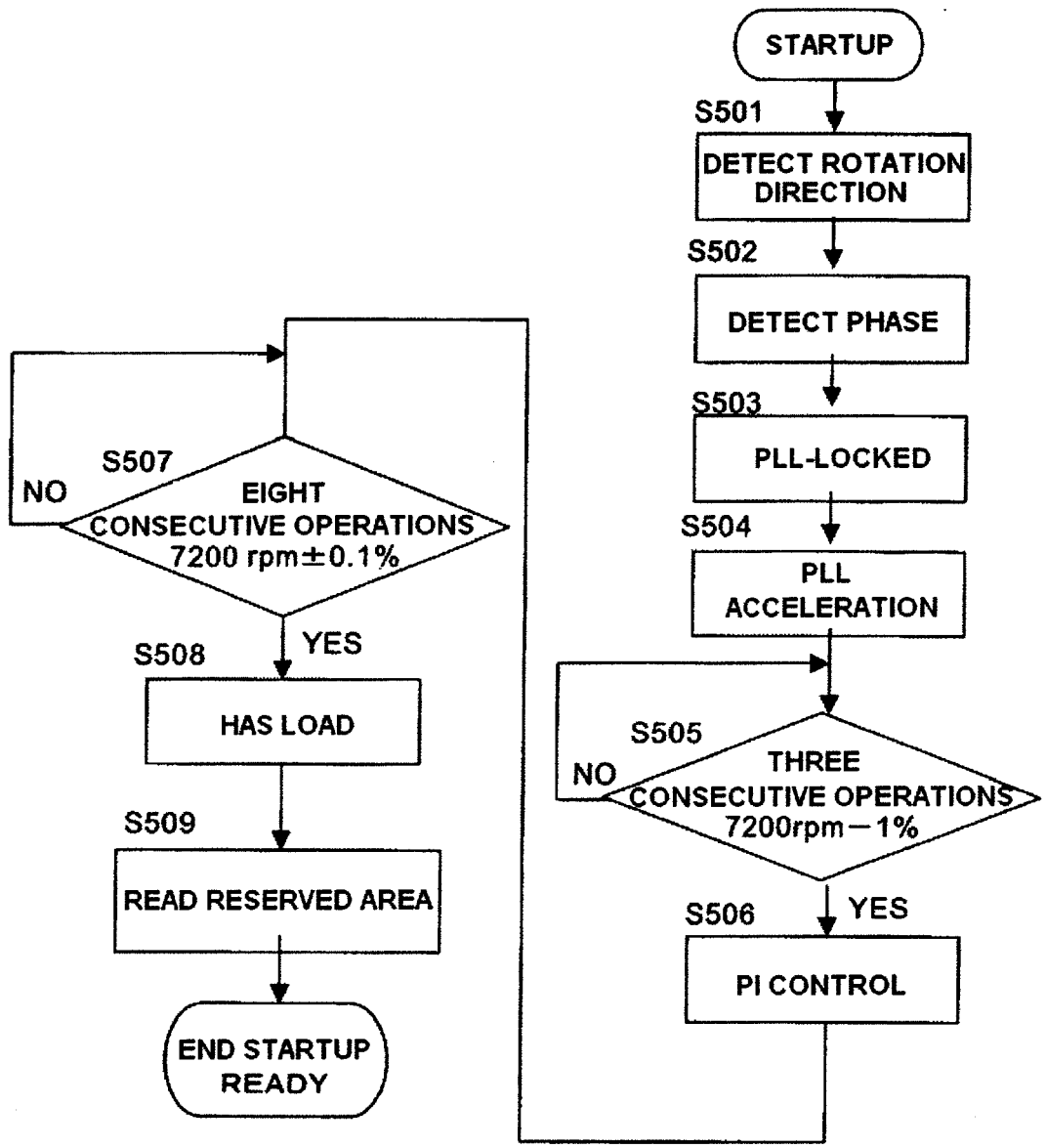
FIG. 5 is a flowchart of a startup sequence of the magnetic disk device according to an embodiment of the present invention.
Figure 6A:
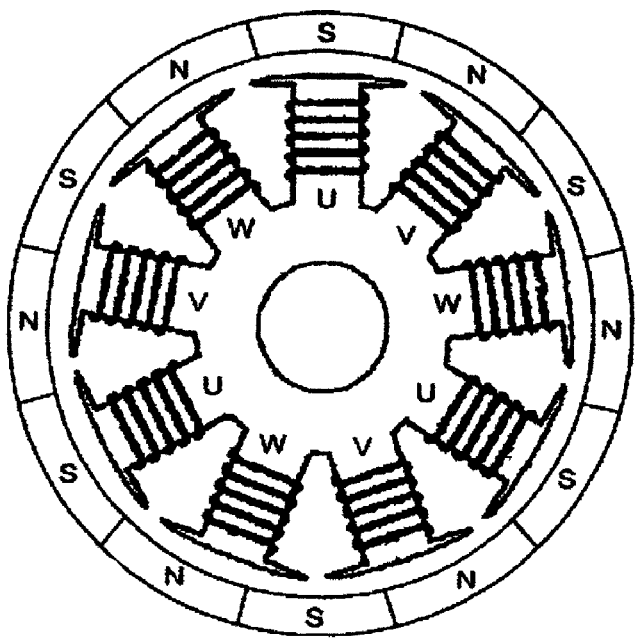
FIGS. 6(a) and 6(b) are plan views showing a structure example of a spindle motor used in the magnetic disk device according to an embodiment of the present invention.
Figure 6B:
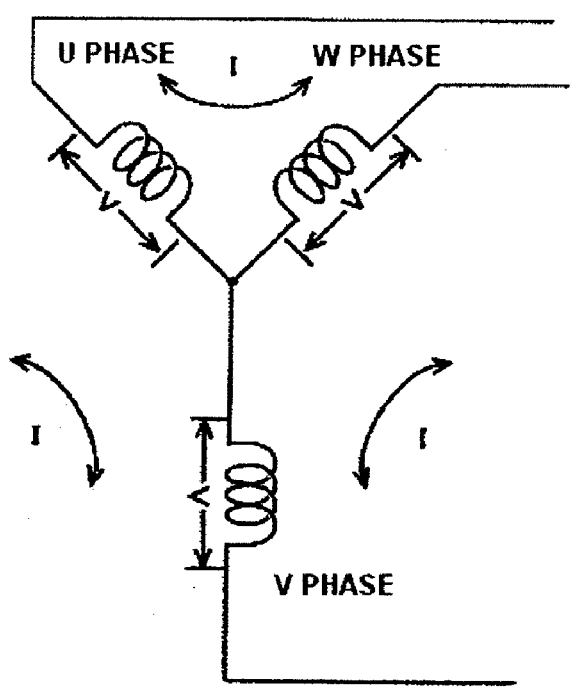

FIG. 5 shows a startup sequence of the magnetic disk device. As shown in FIGS. 6(*a*) and (*b*), description is given of a startup sequence in the case where a typical sensorless 3-phase, 12-pole, 9-throttle DC motor is stationary-rotated at 7200 rpm. The 3-phase motor coil is referred to as a U-phase, a V-phase, and a W-phase. In this example, differences in the number of poles and the number of slots, and the rated rpm are not related to embodiments of the present invention.

If the magnetic disk device 10 is powered on, the spindle motor startup routine is started. The startup routine includes a startup control mode and a rotation control mode. In the startup control mode, the spindle motor 30 that is at rest starts rotating in the correct rotation direction, and the rpm is increased up to a predetermined value. If a fixed condition is satisfied, the mode is switched to a rotation control mode to keep the rated rpm under the control.

More specifically, in the startup control mode, first, a current is supplied to two (for example, U phase and V phase) out of three phases (U phase, V phase, and W phase) in the state that the spindle motor 30 is at rest, and induced voltage generated in the remaining one coil (in this case, W phase) is detected to detect a rotor position (S501) Next, the order in which a current is supplied to each phase is selected in accordance with the detected rest state (positional relation between the rotor and the stator) so as to start in the correct rotational direction to supply the drive current (S502)

Further, when the startup routine is started, the MPU 101 can receive a power supply voltage value (Vcc) and ambient temperature from the AD converter 105.

Even after the spindle motor 30 starts rotating, the rotor position can be similarly detected, so a pulse can be output at a predetermined position. The pulse and a timer are referenced to grasp the rpm of the spindle motor 30. In the startup control mode, the rotation is accelerated up to 7200 rpm, and the pulse is synchronized to a predetermined frequency under control (PLL lock) if the rpm exceeds 2880 rpm (S503) and the frequency is successively changed up to 7200 rpm (120 Hz) (PLL acceleration) (S504). If the state that the rpm is 7200 rpm−1% is continuously kept in a period corresponding to three rotations, the startup control mode is switched to a rotation control mode (S505)

In the rotation control mode, the feedback control based on PI control is performed to control the rpm to be kept at 7200 rpm±0.1% (S506). The state that the rpm is 7200 rpm±0.1% is kept in a period corresponding 8 rotations, the rotation of the spindle motor 30 is determined stabilized (S507), and the HSA 50 is loaded to the rotating magnetic disk 11 (S508)

If the HSA 50 is loaded, the magnetic disk device 10 reads a reserved area on the magnetic disk where necessary system information is written (S509). If the data can be successfully read, and necessary preparation is completed, the magnetic disk device 10 can send READY to the host 150.

When the HSA 50 is loaded, a stationary air flow in the disk enclosure 20 generated by the magnetic disk 11 rotating at 7200 rpm in the unloaded state is abruptly disturbed to thereby abruptly increase a rotational load on the spindle motor 30. After loading, the stationarization is performed with the rotational load increased by an amount corresponding to silhouette of the HSA 50 that is reflected on the rotating magnetic disk 11. A stationary load due to the loaded HSA 50 is 30% larger than a load with the HSA unloaded.

Even upon loading the HSA 50, the rpm of the spindle motor 30 is controlled to be kept at 7200 rpm±0.1%. Accordingly, the spindle motor driving system, that is, the SPM driver 111 needs to have a margin enough to deal with a temporary increase upon loading and an increase in stationary load after loading.

Figure 7:
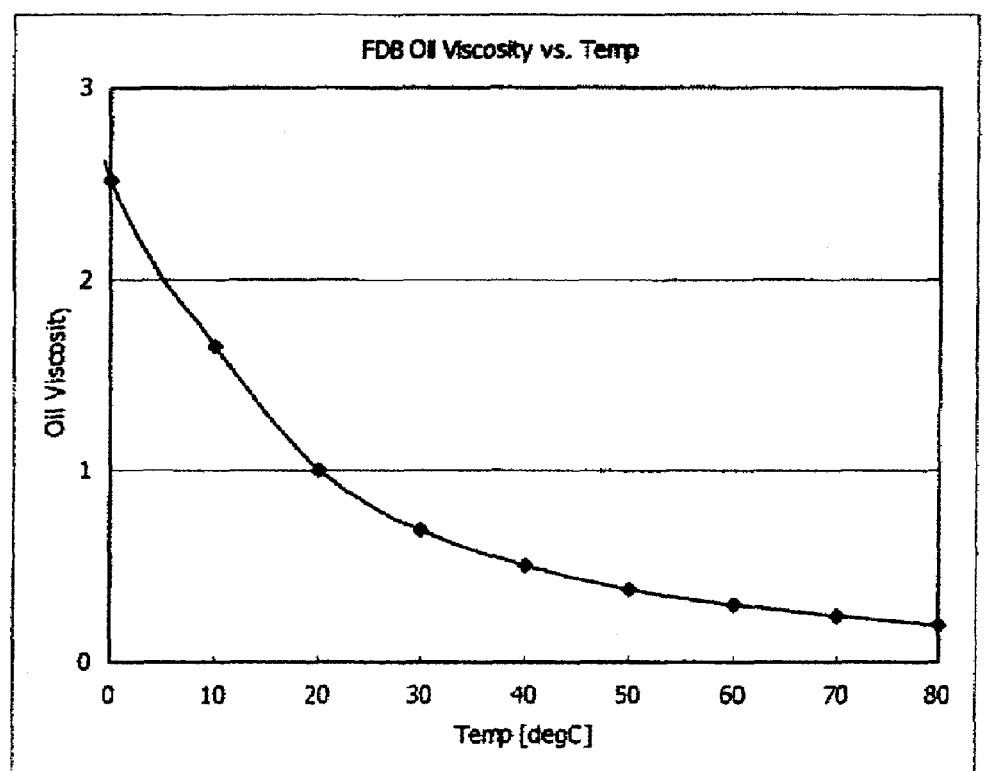
FIG. 7 is a graph showing change in viscosity of a lubrication fluid used in the spindle motor relative to ambient temperature according to an embodiment of the present invention.

FIG. 7 shows a relation between the ambient temperature and the viscosity of the lubrication fluid used in the fluid dynamic bearing. The vertical axis of the graph represents the viscosity of the lubrication fluid, and the horizontal axis represents the ambient temperature. The viscosity is standardized based on the ambient temperature of 20° C. In general, the viscosity of the lubrication fluid abruptly increases when the temperature lowers. That is, the magnetic disk device 10 is powered on after left for a long period under low-temperature conditions (for example, 0° C.), and the viscosity of the lubrication fluid in the spindle motor 30 is 2.5 times as high as the viscosity under ambient temperature (for example, 20° C.). Therefore, a rotational load of the spindle motor 30 is increased by an amount corresponding to an increase in viscosity of the lubrication fluid.

However, the motor coil generates heat as the spindle motor 30 is started and rotated, so the lubrication fluid is rapidly warmed and its viscosity is rapidly lowered. That is, the rotational load of the spindle motor 30 is rapidly decreased. If the rotation state is continued even for several seconds, the viscosity of the lubrication fluid is about 1.5 times or less as high as that under ambient-temperature conditions.

When the spindle motor 30 is rotated, a back electromotive force corresponding to a torque constant and rpm of the spindle motor is generated. For example, if a spindle motor with the torque constant of 7.9 Nm/A is rotated at 7200 rpm, a back electromotive force of 6 V is generated. Thus, provided that a supply voltage of the spindle motor driving system is 12 V, the coil resistance of the spindle motor is 2.4 ohms, a sensor resistance is 0.1 ohms, and a circuit resistance is 1.5 ohms, 1.5 A of current can substantially flow through the spindle motor. In this example, if a supply voltage is 10.8 V (−10% of the rated voltage of 12 V), a flowable current amount is reduced to the 1.23 A.

To start the spindle motor 30, and increase and keep the rpm to the rated speed, it is necessary to suppress the total rotational load of the spindle motor 30 such as the aforementioned rotational load due to the viscosity of the lubrication fluid, a windage loss due to rotations of the magnetic disk 11, a drag torque due to loading of the HSA 50, and an increase in windage loss due to loading of the HSA 50, within the torque range determined by (flowable current amount)×(torque constant).

Further, even if the load falls within the range, unless the spindle motor driving system has a margin (voltage margin), sufficient dynamic range cannot be secured. In response to the load change, the rated speed of the spindle motor could not be kept.

To that end, in order to solve the above problems, at the time of starting under low-temperature conditions, the magnetic disk device 10 of this embodiment sets a waiting time before the HSA 50 is loaded onto the magnetic disk 11 within such a range that the timeout of the host 150 does not occur, and heats the spindle motor itself by rotation of the spindle motor 30 to reduce the viscosity of the lubrication fluid to ensure a voltage margin enough for the SPM driver 111.

A first embodiment of the present invention is described. The ambient temperature around the magnetic disk device 10 can be grasped with the temperature sensor mounted to the flexible cable 45 in the disk enclosure. An increase in rotation resistance of the spindle motor 30 resulting from change in viscosity of the lubrication fluid accompanying change in ambient temperature can be expected based on the data of FIG. 7. Hence, if the environment upon startup is low-temperature environment, the magnetic disk device 10 can set a waiting time in a period from when the spindle motor 30 reaches the rated speed until when the HSA 50 is loaded within such a range that the timeout does not occur, in accordance with the ambient temperature. The waiting time are set to 1 to several seconds within such a range that the timeout does not occur. The spindle motor 30 is rotated at the rated speed and thus heated during the waiting time, and thus, the viscosity of the lubrication fluid drops and the rotation resistance of the spindle motor 30 is considerably lowered.

Here, the magnetic disk device 10 can determine whether or not to set a waiting time and adjust a length of the waiting time based on the ambient temperature upon the startup. The ambient temperature and the waiting time are associated in a table and the table is previously stored in the memory 10 and can be referenced after startup.

For example, the waiting time is set to 5 seconds if the ambient temperature ranges from 0° C. to 5° C., is set to 2 seconds in the range of 5° C. to 10° C., and is not set at more than 10° C.

A second embodiment of the present invention is now described. The magnetic disk device 10 can grasp the ambient temperature around the magnetic disk device itself and in addition, a voltage supplied from the host (Vcc). If the environment upon startup is low-temperature environment and supply voltage is low, it is more difficult to ensure a sufficient voltage margin for the SPM driver 111 upon the startup. Hence, the magnetic disk device 10 can similarly determine whether or not to set the waiting time and adjust a length of the waiting time based on a combination between the ambient temperature and the supply voltage upon the startup. A matrix relation between a combination between the ambient temperature and the supply voltage and the waiting time is previously stored in the memory 106 and can be referenced upon the startup.

For example, if the ambient temperature is 0° C. to 5° C., and the supply voltage is 10.8 V to 11.4 V, a waiting time is set to 5 seconds. Likewise, if the supply voltage is 11.4 V to 12.0 V even through the ambient temperature is 0° C. to 5° C., a waiting time is set to 3 second. Further, if the supply voltage is higher than 12.0 V even though the ambient temperature is 0° C. to 5° C., a waiting time can be set to 1 second. As described above, a waiting time is set based on a combination between the ambient temperature and the supply voltage, by which READY can be sent back as quickly as possible without setting a waiting time more than necessary.

Figure 8A:
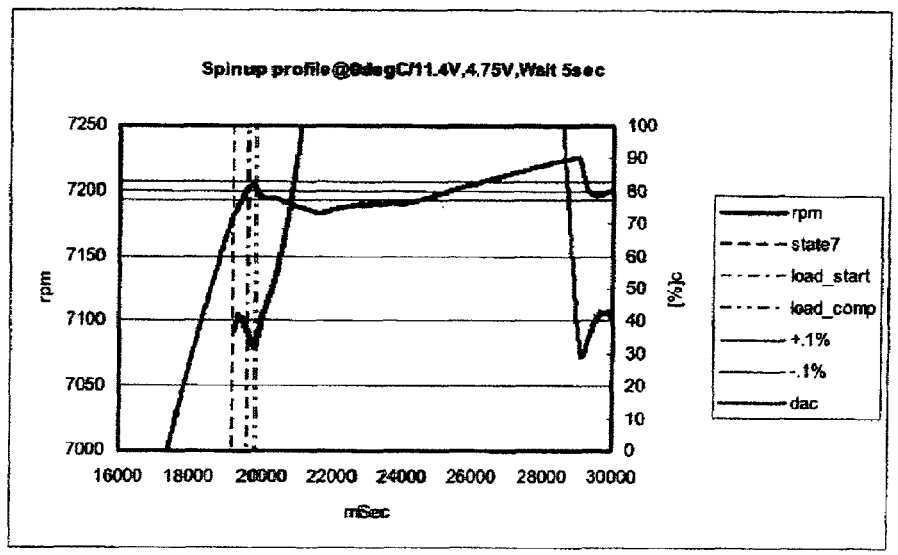
FIGS. 8(a) and 8(b) are graphs showing startup conditions of a spindle motor under low-temperature and low-voltage conditions in the magnetic disk device according to an embodiment of the present invention.
Figure 8B:
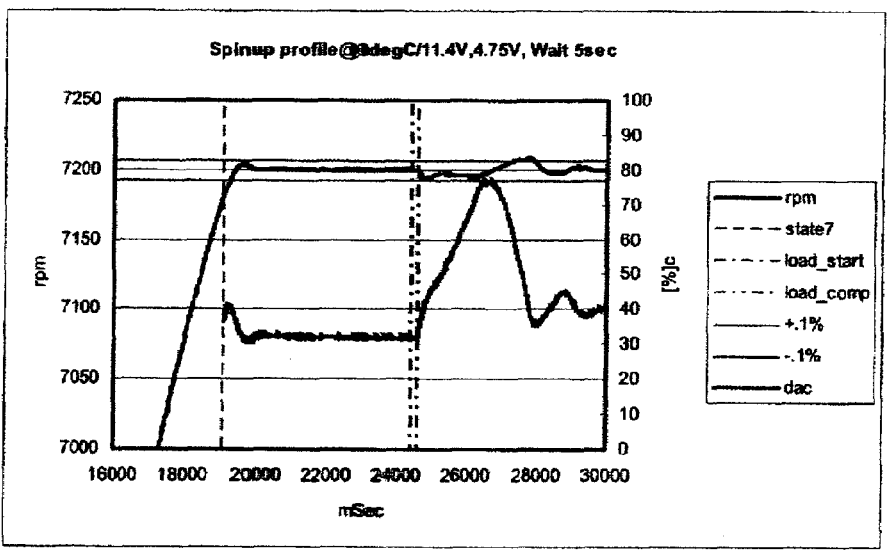

FIG. 8 shows data representing how a spindle motor is started under low ambient temperature (more specifically, 0° C.) and low supply voltage (more specifically, 11.4 V) in a magnetic disk device incorporating five 3.5-inch disks. FIG. 8(a) shows the conventional startup condition where the waiting time is 0 seconds, and FIG. 8(b) shows the startup condition of the present invention where the startup time is set to 5 seconds. The left vertical axis represents the rpm of the spindle motor (unit: rpm), the left vertical axis represents a duty ratio (unit:%) of a DAC (not shown) in the SPM driver 111, the horizontal axis represents an elapsed time from power ON (unit: millisecond) (16 seconds to 30 seconds from startup). If the rated rpm is 7200 rpm, the rated speed should be 7200 rpm±0.1% so that the magnetic disk device is READY, and an allowable range of the rpm is indicated by the dotted line. In the data, the solid line represents the rpm of the spindle motor, and hashed thick line represents a duty ratio of the DAC.

In FIG. 8(a), the spindle motor reaches 7200 rpm in an unloaded state, and if determined to be stabilized as described above, the HSA 50 is loaded. The vertical lines in the graph represent a timing of switching to a rotation control mode (PI control) (denoted by state 7 in the graph), a timing at which the loading of the HAS 50 is started (denoted by load-start in the graph), and a timing at which the loading of the HSA 50 is completed (load-comp in the graph) in the order from the left side. The duty ratio of the DAC in the SPM driver 111 is continuously increased after the loading of the HSA 50 in order to keep the spindle motor rpm up with an increase in rotational load of the spindle motor due to loading of the HSA 50. The duty radio reaches 100% in the end. If the duty ratio of the DAC is 100%, it is impossible to appropriately control the rpm of the spindle motor, so the rpm of the spindle motor is stabilized beyond the allowable range and cannot be converged to 7200 rpm. Around at 29 seconds from the startup, the rpm is returned to a range where rotation control can be performed, due to reduction in rotation load resulting from decrease in lubrication fluid viscosity accompanying the rotation of the spindle motor but starts converging on the rated rpm from then. Thus, the rpm cannot be stabilized to the rated rpm in 30 seconds, and the magnetic disk device is not READY.

On the other hand, in FIG. 8(b), the spindle motor 30 reaches 7200 rpm in the unloaded state, and if it is determined to be stabilized in accordance with the above startup sequence, the HSA 50 is loaded after the waiting time of 5 seconds. During this waiting time of 5 seconds, the lubrication fluid in the spindle motor is heated, and the viscosity is considerably lowered to remarkably decrease a rotation frequency of the spindle motor. As a result, even if the duty ratio of the DAC in the SPM driver 111 is increased to keep the spindle motor rpm up with an increase in rotation load due to the loading, the voltage margin of the SPM driver 111 can be secured, so it is converged to about 80%. Thus, even if the rpm almost exceeds an allowable range temporarily after the loading, proper control can be performed, so the rpm of the spindle motor 30 converges on the rated rpm within the allowable range, and the duty ratio of the DAC is also stabilized at about 40% after the loading. In this case, assuming that timeout is 30 seconds, even if a waiting time of 5 seconds is set, the magnetic disk device 10 loads the HSA 50 within 30 seconds, and the spindle motor is at the rated speed, so the device is READY and timeout does not occur.

A third embodiment of the present invention is described below. In the case where a voltage margin of the SPM driver 111 is hardly secured, for example, the ambient temperature around the magnetic disk device 10 is low or a voltage supplied to the magnetic disk device 10 is low, an rpm increase curve of the spindle motor relative to the elapsed time from the startup becomes gradient. Then, it is possible to determine whether or not to set a waiting time and adjust a length of the waiting time based on the gradient of the rpm increase curve of the spindle motor, that is, increase in ramp as parameters in place of a combination between the ambient temperature and the supply voltage. In this case, a process of determining a waiting time based on a method of calculating the gradient of the curve and the gradient, that is, the increase is expressed as an algorithm, and executed on the memory 106.

For example, in the startup control mode, a period necessary for the spindle motor rpm to increase from 7000 rpm to 7150 rpm is measured, and if the period is 1 or more seconds, a waiting time of 5 seconds is set. Further, if a period necessary to increase the spindle motor rpm from 7000 rpm to 7150 rpm is 0.7 seconds or more and less than 1.0 second, a waiting time of 3 seconds is set. Further, if a period necessary to increase the spindle motor rpm from 7000 rpm to 7150 rpm is 0.7 seconds or less, a waiting time is not set, that is, a waiting time is set to 0 seconds. In this case, the above determination can be made based on information retrieved from the spindle motor driving system, so it is unnecessary to measure ambient temperature around the magnetic disk device 10 and the supply voltage.

Further, it is possible to determine whether or not to set a waiting time and adjust a length of the waiting time based on the ambient temperature or a combination between a combination between the ambient temperature and the supply voltage as parameters in similar manner. Hence, necessary conditions for a waiting time can be more finely determined.

The torque constant of the spindle motor has a predetermined distribution due to variations in manufacturing process, so an increase in rpm is high in the magnetic disk device with a spindle motor having a high torque constant. For example, even if the ambient temperature is 0° C. to 5° C. and the supply voltage is 10.8 V to 11.4 V, in the case where a period necessary to increase the spindle motor rpm from 7000 rpm to 7150 rpm is 0.7 seconds or more and less than 1.0 second, a waiting time is set to 4 seconds, not 5 seconds. As a result, the necessary waiting time can be optimized, and READY can be sent back as fast as possible.

A fourth embodiment of the present invention is described. In general, the magnetic disk device 10 reads a reserved area upon the startup (region where system information is written). In this case as well, similar to the general operation of reading user data, the rpm of the spindle motor 30 should be 7200 rpm±0.1%. However, if the ambient temperature is low and the supply voltage is low, the rotation accuracy of the spindle motor might need much time to stabilize, or the rotation accuracy might be unstable. Thus, a rotation accuracy upon reading a reserved area is relaxed only in a predetermined period from the startup of the spindle motor. By relaxing the rotation accuracy of the spindle motor, data written to a reserved area can be read and READY can be sent back even if the rpm is not within a specified range of the rated rpm necessary for writing/reading user data.

For example, in the case of writing/reading data in the reserved area, a timing adjustment width of a read gate of the read/write channel 104 is set three times as large as an adjustment width upon reading user data. In this way, an allowable variation range of the rotation accuracy of the spindle motor is increased threefold, that is, 7200 rpm±0.3% only upon reading data in the reserved area. In this way, if necessary data in the reserved data can be read, the magnetic disk device can send back READY. While the spindle motor is rotating, the lubrication fluid is heated, so the spindle motor can be set to the rated speed (7200 rpm±0.1%) after a while. In this case, after the magnetic disk device sends back READY, it is checked whether or not the spindle motor is at the rated speed, and then, user data may be written/read in response to a command of the host. At this time, it is unnecessary to insert the above waiting time.

In this case, it is possible to determine whether or not to relax the rotation accuracy of the spindle motor upon reading data in the reserved area based on the ambient temperature or a combination between the ambient temperature and the supply voltage as parameters and a combination between these parameters and the rpm of the spindle motor. Likewise, an allowable range for relaxing the rotation accuracy of the spindle motor can be determined.

Further, a waiting time is inserted and in addition, a rotation accuracy of the spindle motor is relaxed, by which READY can be sent back with no timeout more reliably. For example, if a period necessary to increase the spindle motor rpm from 7000 rpm to 7150 rpm is 1.0 or more seconds under the condition that the ambient temperature is 0° C. to 5° C., and the supply voltage is 10.8 V to 11.4 V, a waiting time of 5 seconds is set. At this time, if a waiting time of 5 seconds or more cannot be set in consideration of timeout relative to the host, the rpm is not stabilized in a range of 7200 rpm±0.1% after a waiting time of 5 seconds. Unless data can be read from the reserved area, timeout occurs. In this case as well, if the rotation accuracy of the spindle motor upon reading is relaxed to 7200 rpm±0.3%, the data can be successfully read, and READY can be sent back with not timeout.

The first and second embodiments describe the magnetic disk device having a load/unload mechanism, but the first and second embodiments are applicable to a magnetic disk device that contacts, starts, and stops without using the load/unload mechanism. In this case, the waiting time may be set in a period from when the spindle motor reaches the rated speed until when the READY is sent back. Likewise, the third and fourth embodiments are applicable to both of a magnetic disk device having a load/unload mechanism and a magnetic disk device that contacts, starts, and stops.

The present invention is described so far based on the particular embodiments illustrated in the drawings, but the present invention is not limited to the embodiments. Needless to say, any known structure can be adopted as long as an effect of the present invention is attained.

What is claimed is:

1. A magnetic disk device, comprising:
a spindle motor using a fluid dynamic bearing;
an rpm detecting unit detecting rpm of the spindle motor; and
a temperature measuring unit measuring an ambient temperature for the magnetic disk device, characterized in that upon starting the magnetic disk device, a waiting time preset in accordance with the ambient temperature measured with the temperature measuring unit is inserted to a period from when the spindle motor reaches a rated speed until when an indication of an ability of the magnetic disk device to enter a useable state is sent back to a host from the magnetic disk device, the magnetic disk device further comprising a voltage measuring unit measuring a voltage applied to the magnetic disk device, characterized in that a waiting time preset in accordance with a combination between the ambient temperature measured with the temperature measuring unit and the voltage measured with the voltage measuring unit is inserted.

2. The magnetic disk device according to claim 1, characterized in that upon starting the magnetic disk device, a rotational accuracy of a spindle motor in reading data in a reserved area of a magnetic disk is lower than a rotational accuracy of the spindle motor in reading user data after the magnetic disk device has sent the indication of its ability to enter the useable state.

3. A magnetic disk device, comprising:
a spindle motor using a fluid dynamic bearing;
an rpm detecting unit detecting rpm of the spindle motor; and
a temperature measuring unit measuring an ambient temperature for the magnetic disk device, characterized in that upon staffing the magnetic disk device, a waiting time preset in accordance with the ambient temperature measured with the temperature measuring unit is inserted to a period from when the spindle motor reaches a rated speed until when an indication of an ability of the magnetic disk drive to enter a useable state is sent back to a host from the magnetic disk device, the magnetic disk device further comprising, a load/unload mechanism, characterized in that upon staffing the magnetic disk device, a waiting time preset in accordance with the ambient temperature measured with the temperature measuring unit is inserted to a period from when the spindle motor reaches a rated speed until when a head stack assembly is loaded, and a voltage measuring unit measuring a voltage applied to the magnetic disk device, characterized in that a waiting time preset in accordance with a combination between the ambient temperature measured with the temperature measuring unit and the voltage measured with the voltage measuring unit is inserted.

4. The magnetic disk device according to claim 3, characterized in that upon starting the magnetic disk device, a rotational accuracy of a spindle motor in reading data in a reserved area of a magnetic disk is lower than a rotational accuracy of the spindle motor in reading user data after the magnetic disk device has sent the indication of its ability to enter the useable state.

5. A magnetic disk device, comprising:
a spindle motor using a fluid dynamic bearing;
an rpm detecting unit detecting rpm of the spindle motor;
a time measuring unit measuring an elapsed time from startup of the magnetic disk device; and
an rpm increase calculating unit calculating an increase in rpm per unit time based on the time measured by the time measuring unit and the rpm of the spindle motor detected with the rpm detecting unit, characterized in that upon starting the magnetic disk device, a waiting time preset in accordance with an increase in rpm calculated with the rpm increase calculating unit is inserted to a period from when the spindle motor reaches a rated speed until when an indication of an ability of the magnetic disk device to enter a useable state is sent back to a host from the magnetic disk device.

6. The magnetic disk device according to claim 5, characterized in that upon starting the magnetic disk device, a rotational accuracy of a spindle motor in reading data in a reserved area of a magnetic disk is lower than a rotational accuracy of the spindle motor in reading user data after the magnetic disk device has sent the indication of its ability to enter the useable state.

7. The magnetic disk device according to claim 5, further comprising a load/unload mechanism, characterized in that upon starting the magnetic disk device, a waiting time preset in accordance with the increase in rpm calculated with the rpm increase calculating unit is inserted to a period from when the spindle motor reaches a rated speed until when a head stack assembly is loaded.

8. The magnetic disk device according to claim 7, characterized in that upon starting the magnetic disk device, a rotational accuracy of a spindle motor in reading data in a reserved area of a magnetic disk is lower than a rotational accuracy of the spindle motor in reading user data after the magnetic disk device has sent the indication of its ability to enter the useable state.

9. The magnetic disk device according to claim 5, further comprising a temperature measuring unit measuring an ambient temperature for the magnetic disk device, characterized in that a waiting time preset in accordance with a combination between the ambient temperature measured with the temperature measuring unit and the increase in rpm calculated with the rpm increase calculating unit is inserted.

10. The magnetic disk device according to claim 9, characterized in that upon starting the magnetic disk device, a rotational accuracy of a spindle motor in reading data in a reserved area of a magnetic disk is lower than a rotational accuracy of the spindle motor in reading user data after the magnetic disk device has sent the indication of its ability to enter the useable state.

11. The magnetic disk device according to claim 7, further comprising a temperature measuring unit measuring an ambient temperature for the magnetic disk device, characterized in that a waiting time preset in accordance with a combination between the ambient temperature measured with the temperature measuring unit and the increase in rpm calculated with the rpm increase calculating unit is inserted.

12. The magnetic disk device according to claim 11, characterized in that upon staffing the magnetic disk device, a rotational accuracy of a spindle motor in reading data in a reserved area of a magnetic disk is lower than a rotational accuracy of the spindle motor in reading user data after the magnetic disk device has sent the indication of its ability to enter the useable state.

13. The magnetic disk device according to claim 5, further comprising:
a temperature measuring unit measuring an ambient temperature for the magnetic disk device; and
a voltage measuring unit measuring a voltage applied to the magnetic disk device, characterized in that a waiting time preset in accordance with a combination between the ambient temperature measured with the temperature measuring unit, the voltage measured with the voltage measuring unit, and the increase in rpm calculated with the rpm increase calculating unit is inserted.

14. The magnetic disk device according to claim 13, characterized in that upon starting the magnetic disk device, a rotational accuracy of a spindle motor in reading data in a reserved area of a magnetic disk is lower than a rotational accuracy of the spindle motor in reading user data after the magnetic disk device has sent the indication of its ability to enter the useable state.

15. The magnetic disk device according to claim 7, further comprising:
a temperature measuring unit measuring an ambient temperature for the magnetic disk device; and
a voltage measuring unit measuring a voltage applied to the magnetic disk device, characterized in that a waiting time preset in accordance with a combination between the ambient temperature measured with the temperature measuring unit, the voltage measured with the voltage measuring unit, and the increase in rpm calculated with the rpm increase calculating unit is inserted.

16. The magnetic disk device according to claim 15, characterized in that upon starting the magnetic disk device, a rotational accuracy of a spindle motor in reading data in a reserved area of a magnetic disk is lower than a rotational accuracy of the spindle motor in reading user data after the magnetic disk device has sent the indication of its ability to enter the useable state.

* * * * *

UNITED STATES PATENT AND TRADEMARK OFFICE
CERTIFICATE OF CORRECTION

PATENT NO. : 7,576,936 B2
APPLICATION NO. : 11/899767
DATED : August 18, 2009
INVENTOR(S) : Oshimi et al.

It is certified that error appears in the above-identified patent and that said Letters Patent is hereby corrected as shown below:

In the Claims:

Column 15, line 1, please delete "staffing" and insert -- starting --

Column 15, line 9, please delete "staffing" and insert -- starting --

Column 16, line 23, please delete "staffing" and insert -- starting --

Signed and Sealed this

Third Day of November, 2009

David J. Kappos
*Director of the United States Patent and Trademark Office*